US007825669B2

(12) United States Patent
Parsons et al.

(10) Patent No.: US 7,825,669 B2
(45) Date of Patent: Nov. 2, 2010

(54) MICROWAVE POSITION SENSING FOR A TURBO MACHINE

(75) Inventors: Douglas Parsons, Canton, CT (US); Peter Jalbert, Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 630 days.

(21) Appl. No.: 11/693,091

(22) Filed: Mar. 29, 2007

(65) Prior Publication Data
US 2008/0238776 A1    Oct. 2, 2008

(51) Int. Cl.
*G01R 27/04* (2006.01)
(52) U.S. Cl. ...................... 324/644; 324/637
(58) Field of Classification Search .......... 324/637, 324/644
See application file for complete search history.

(56) References Cited

U.S. PATENT DOCUMENTS

| | | | | |
|---|---|---|---|---|
| 3,541,434 A | * | 11/1970 | Mullen | 324/642 |
| 4,375,057 A | * | 2/1983 | Weise et al. | 187/394 |
| 4,588,953 A | * | 5/1986 | Krage | 324/636 |
| 4,611,184 A | * | 9/1986 | Kumar | 333/100 |
| 5,760,731 A | | 6/1998 | Holmes | |
| 7,271,575 B2 | * | 9/2007 | Pickerd et al. | 324/76.19 |
| 7,434,537 B2 | * | 10/2008 | Behle et al. | 118/723 MW |
| 2005/0228604 A1 | * | 10/2005 | Niedzwiecki et al. | 702/106 |

OTHER PUBLICATIONS

Chuckpaiwong, I. et al., "Radar-based Precision Position Sensor," InTech, Dec. 2002.
Chuckpaiwong, I. et al., "Development of a High Resolution Radar-Based Position Sensor".

* cited by examiner

*Primary Examiner*—Timothy J Dole
*Assistant Examiner*—John Zhu
(74) *Attorney, Agent, or Firm*—Carlson, Gaskey & Olds, P.C.

(57) ABSTRACT

A microwave position sensing system includes a plurality of target components that each move between multiple positions. A microwave generator produces a microwave frequency signal. A divider receives the microwave frequency signal and splits the microwave frequency signal into a plurality of position sensing signals. The position sensing signals are respectively sent to the plurality of target components to determine a position of each of the target components. Each position sensing signal may also be calibrated. In one example, first and second frequencies are transmitted through a common wave guide. The first frequency is reflected prior to reaching the target component to produce a calibration signal. The second signal, which is used to detect the position of the target component, is calibrated using the first frequency.

15 Claims, 2 Drawing Sheets

MICROWAVE POSITION SENSING FOR A TURBO MACHINE

BACKGROUND OF THE INVENTION

This invention relates to sensing the position of various components associated with a turbo machine using a common microwave generator.

Various position sensing systems exist such as variable displacement transducers and Hall effect proximity probes. However, these systems are not suitable in many instances for turbo machines due to limited accuracy and the hostile environment within which they must perform.

Microwave frequency signals have been used to detect the clearance of a turbine component within a turbo machine. A microwave generator produces a signal that is reflected by the turbine component and processed to detect the position of the turbine component.

The position of numerous components within a turbo machine system must be monitored. For example, the vibration and speed of the turbine must be measured along with the position of a variable stator vane, fuel metering valve, rotary actuators and numerous other components. However, it is cost prohibitive to employ a microwave generator for each component. What is needed is a microwave position sensing system that cost effectively monitors the position of numerous target components within a turbo machine.

SUMMARY OF THE INVENTION

A microwave position sensing system includes a plurality of target components that each move between multiple positions. A microwave generator produces a microwave frequency signal. A divider receives the microwave frequency signal and splits the microwave frequency signal into a plurality of position sensing signals. The position sensing signals are respectively sent to the plurality of target components to determine a position of each of the target components.

Each position sensing signal may also be calibrated. In one example, first and second frequencies are transmitted through a common wave guide. The first frequency is reflected prior to reaching the target component to produce a calibration signal. The second signal, which is used to detect the position of the target component, is calibrated using the first frequency.

The example microwave position system and method cost effectively monitor the position of multiple target components using a common microwave generator.

These and other features of the present invention can be best understood from the following specification and drawings, the following of which is a brief description.

DETAILED DESCRIPTION OF THE PREFERRED EMBODIMENT

Figure 1:
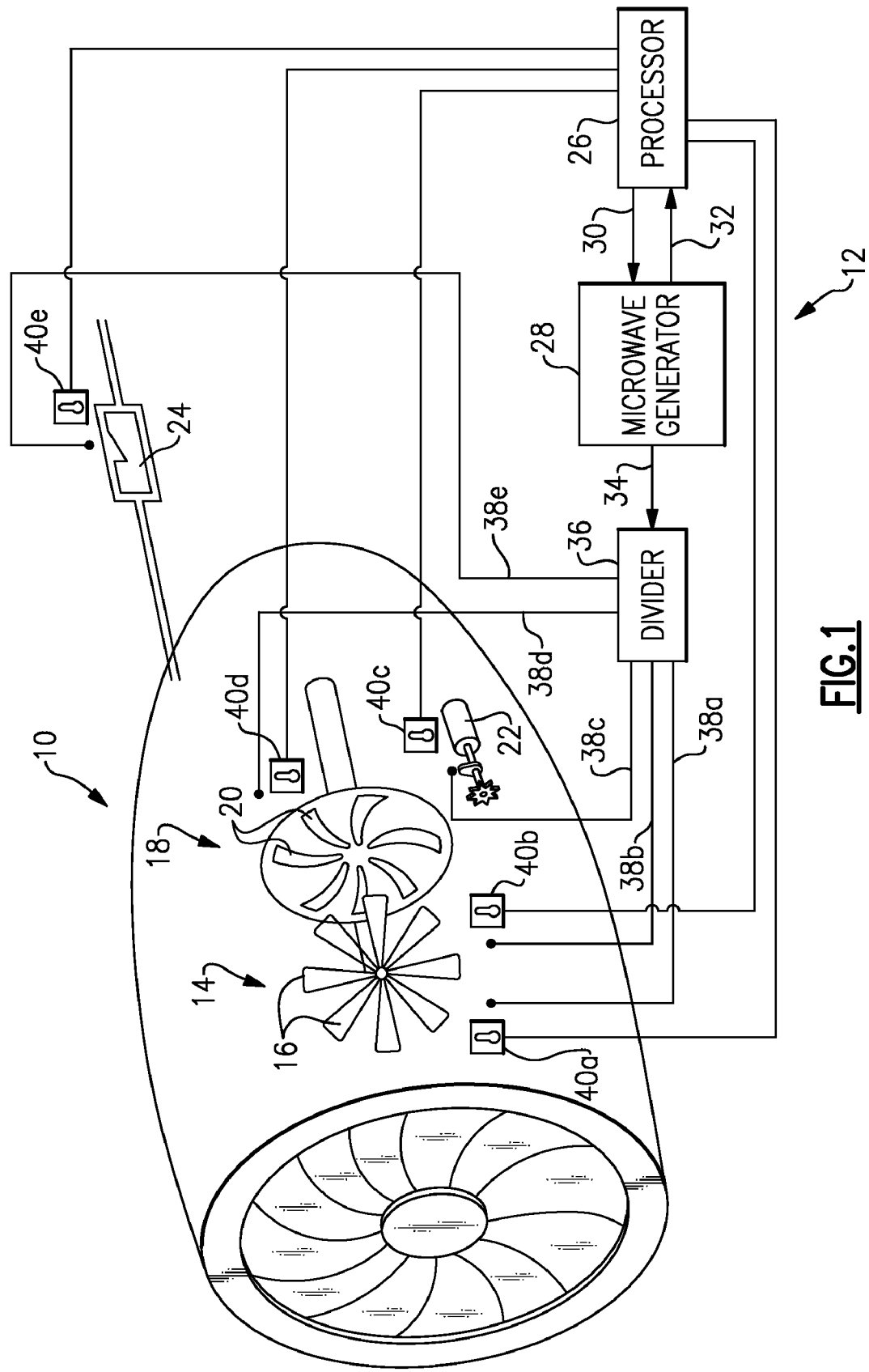
FIG. 1 is a schematic view of one example microwave position sensing system using a common microwave generator for monitoring multiple target components associated with a turbo machine.

FIG. 1 is a highly schematic view of a turbo machine 10 that utilizes a microwave position sensing system 12. The turbo machine 10 includes a turbine 14 having multiple blades 16. Typically it is desirable to monitor the clearance between the turbine and adjacent housing and to monitor the vibration and speed of the turbine. The turbo machine 10 also includes a variable stator 18 having vanes 20 for which the position is monitored. The turbo machine 10 may also include various rotary actuators 22, fuel metering valves 24, and other components that are monitored.

The microwave position sensing system 12 includes a processor 26 that communicates with a microwave generator 28 using, for example, command and feedback signals 30 and 32. The various arrows used in the schematics are illustrative only and are in no way intended as limiting. For example, single and/or multiple signals may carried by single and/or multiple wires. Alternatively, the signals may be communicated using wireless transmission. Moreover, more or fewer communications may be carried out than represented by the lines in the schematics.

The microwave generator 28 provides a microwave frequency signal 34 to a divider 36. The microwave frequency signal may include one or more distinct frequencies or a range of frequencies. The divider 36 splits the microwave frequency signal 34 into multiple position sensing signals 38 mechanically and/or electrically, as will be discussed in greater detail relative to FIGS. 2 and 3.

With continuing reference to FIG. 1, the divider 36 provides multiple position sensing signals 38a-38e (collectively referred to as "38") to multiple target components, such as the turbine 14, variable stator 18, rotary actuator 22, and fuel metering valve 24. In the example shown, the fuel metering valve 24 includes a ramped surface that reflects the position sensing signal 38e.

As is known in the use of microwave frequencies for detecting position, the microwave signal is directed at a target, and the phase and signal strength of the frequency reflected from the target is measured to determine the position of the target. The reflected signal may bypass the divider 36 and be communicated directly to the processor 26. Typically the signal is carried to the target by a valve guide, as is known in the art. The frequency used for each target is selected based upon the distance of the target and other factors.

In one example, the position sensing signals 38 can be calibrated using a temperature sensor 40a-40e (collectively referred to as "40") located near by the respective position sensing signal 38a-38e. The temperature sensors 40 account for any thermal growth in the target component and/or wave guide associated with the target component.

Figure 2:
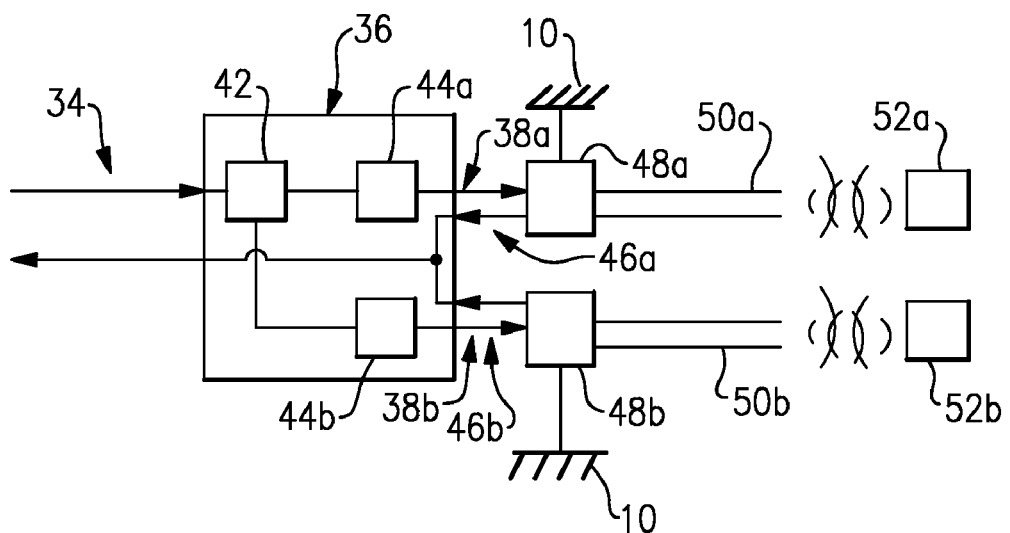
FIG. 2 is a schematic view of a divider electrically splitting the microwave frequency signal.

Referring to the example shown in FIG. 2, the divider 36 receives the microwave frequency signal 34 and electrically splits the signal to provide two position sensing signals 38a and 38b. The microwave frequency signal 34 passes through a timer 42 that sequentially delivers the microwave frequency 34 to first and second couplers 48a and 48b respectively with coaxial cables 46a and 46b. Additionally or alternatively, the microwave frequency signal 34 may pass through filters or multipliers 44a and 44b to deliver the desired frequency (or frequencies) to the respective coupler 48a and 48b.

The couplers 48a and 48b transmit the electrical signal to corresponding wave guides 50a and 50b to deliver the position sensing signals 38a and 38b to respective target components 52a and 52b. The position sensing signal 38a and 38b is reflected by its respective target component and transmitted back through the respective wave guides and couplers. Ultimately, the position sensing signals are received back by the processor 26, which translates the phase and signal strength of the return signal to a position associated with the target component.

Figure 3:
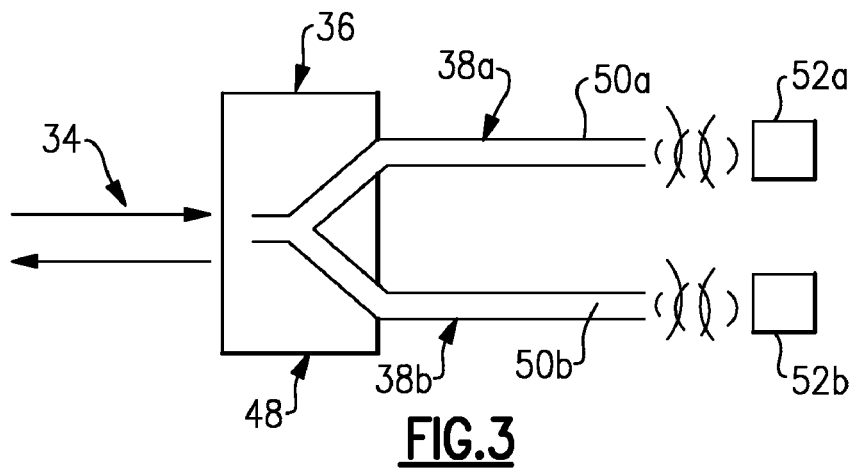
FIG. 3 is a schematic view of a divider mechanically splitting the microwave frequency signal.
Figure 4:
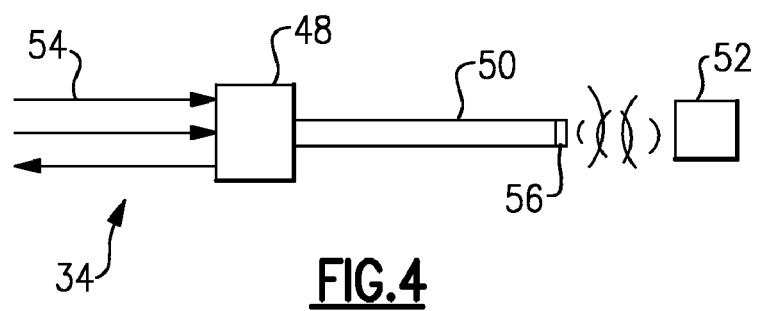
FIG. 4 is a schematic view of a calibration signal used to calibrate a position sensing signal.

Referring to an example shown in FIG. 3, the divider 36 comprises a coupler 48 that mechanically splits the microwave frequency signal 34 into position sensing signals 38a and 38b transmitted along wave guides 50a and 50b. The reflected waves from the target components 52a and 52b are received by the wave guides 50a and 50b, as described above relative to FIG. 2.

FIG. 1 illustrated temperature sensors 40 used to correct or calibrate the return position sensing signals. Alternatively, the microwave frequency signal 34 may be used to calibrate the position sensing signals. In one example, the microwave frequency signal 34 includes first and second frequencies. The first frequency corresponds to a calibration signal 54 of a different frequency than the second frequency. The second frequency is used as a position sensing signal, as described above relative to FIGS. 1-3. The calibration signal 54 is sent to the coupler 48. A structural feature 56, such as a metallic feature or an alumina plug, may be arranged near the end of the wave guide 50. The first frequency is selected so that it is reflected by the structural feature 56 and returned to the processor 26. In this manner, the calibration signal 54 may be used to measure the effects of the temperature on the wave guide 50 so that any changes in its length due to temperature can be measured by the calibration signal 54. Adjustments to the position sensing signal can then be made using the calibration signal.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A microwave position sensing system comprising:
    a plurality of target components each moving between multiple positions;
    a microwave generator producing a microwave frequency signal; and
    a divider receiving the microwave frequency signal and splitting the microwave frequency signal into a plurality of position sensing signals and configured to send the position sensing signals to the plurality of target components for determining a position of the target component associated therewith, wherein the microwave frequency signal includes a calibration signal operating at a first frequency and at least one of the plurality of position sensing signals operating at a second frequency that is different than the first frequency.

2. The system according to claim 1, wherein the divider mechanically splits the microwave frequency signal into the plurality of position sensing signals.

3. The system according to claim 1, wherein the divider electrically splits the microwave frequency signal into the plurality of position sensing signals.

4. The system according to claim 1, wherein at least one electrical cable carries the plurality of position sensing signals to at least one coupler that is connected to at least one wave guide, the wave guide proximate to the target component.

5. The system according to claim 4, wherein the divider is arranged between the microwave generator and the coupler.

6. The system according to claim 1, wherein the target components are remote from one another and associated with a turbo machine.

7. The system according to claim 6, wherein one of the target components is a fuel metering valve.

8. The system according to claim 6, wherein one of the target components is at least one of a rotary and linear actuator.

9. The system according to claim 6, wherein one of the target components is a variable stator vane.

10. A method of position sensing using microwaves comprising the steps of:
    a) transmitting a microwave signal;
    b) dividing the microwave signal into multiple position sensing signals;
    c) transmitting the multiple position sensing signals to a plurality of target components; and
    d) determining a position of each of the target components using the multiple position sensing signals, including using a calibration signal to adjust the multiple position sensing signals, wherein the calibration signal is operating at a first frequency and the position sensing signal is operating at a second frequency that is different than the first frequency, and wherein the microwave signal contains the first frequency and the second frequency.

11. The method according to claim 10, wherein step b) includes dividing the microwave signal mechanically into the multiple position sensing signals.

12. The method according to claim 10, wherein step b) includes dividing the microwave signal electrically into the multiple position sensing signals.

13. The method according to claim 10, wherein step a) includes transmitting first and second frequencies through a common wave guide, the first and second frequencies respectively corresponding to the microwave signal and a position sensing signal; and comprising the steps of;
    e) reflecting the first frequency prior to reaching the target component to produce a calibration signal; and
    f) calibrating a position sensing signal associated with the second frequency using the calibration signal.

14. The method according to claim 13, wherein the wave guide includes a structural feature, and step e) includes reflecting the first frequency with the structural feature, the calibration signal corresponding to a temperature effect on the position sensing signal.

15. The method according to claim 14, wherein the structural feature is a metallic plug near an end of the wave guide.

* * * * *